Inventor
Otto Tschumi
By Robert E. Burns
Attorney

Patented Nov. 7, 1950

2,529,118

UNITED STATES PATENT OFFICE 2,529,118

DOUBLE-ACTING RECTIFIER ARRANGEMENT COOPERATING WITH AT LEAST ONE ALTERNATING CURRENT-EXCITED ELECTROMAGNET, PARTICULARLY AN ELECTROMAGNETIC RELAY

Otto Tschumi, Soleure, Switzerland, assignor to Autophon Aktiengesellschaft, Soleure, Switzerland Application December 30, 1947, Serial No. 794,577
In Switzerland July 18, 1945

Section 1, Public Law 690, August 8, 1946
Patent expires July 18, 1965

5 Claims. (Cl. 175—335)

Double-acting rectifier arrangements with two or four cells in cooperation with electro-magnets are known. Such arrangements enable to use direct current magnets, particularly direct current relays to be used in alternating current circuits without such magnets having the tendency of buzzing.

Furthermore, direct current relays with retarded action are used for the same purpose, with a half-wave rectifier in parallel or in series. The disadvantage of the first mentioned alternative is the considerable quantity of rectifiers, whereas the disadvantage of the second alternative is that the excitation output is relatively small owing to the second half-wave being inactive, thus there exists a tendency to buzz.

In the double-acting rectifier arrangement according to the invention, cooperating with at least one alternating current-excited electro-magnet, particularly an electro-magnetic relay such disadvantages are avoided. In this case, the electro-magnet possesses two magnetically-opposed windings. The ampere-turns of the two windings are different. A half-wave rectifier is connected with respect to the winding possessing the higher number of ampere-turns in such a manner that one half-wave of the alternating current flows through this winding, whereas both half-waves flow through the other winding.

Executional forms according to the invention are illustrated in the drawing.

Figure 1:
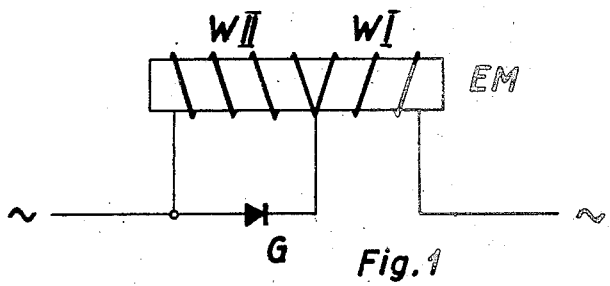
Fig. 1 shows an electro-magnet with two windings in cooperation with rectifier valve.

The electro-magnet EM to be excited (Fig. 1) possesses the two magnetically-opposed windings $W_I$ and $W_{II}$ which are so dimensioned that the number of ampere-turns of $W_{II}$ is higher than that of $W_I$. The rectifier G is in parallel with the winding $W_{II}$. The working of the arrangement is the following:

For half-wave 1 (see Fig. 3) the rectifier short-circuits the winding $W_{II}$. Thus, only the winding $W_I$ is being excited. For half-wave 2 the rectifier offers a high resistance. The current flows not only through the winding $W_I$, but also through the winding $W_{II}$. The excitations of both windings act in opposite directions. Owing to the fact that the excitation of winding $W_{II}$ is higher than that of winding $W_I$, the field of the electro-magnet EM possesses the same direction as during half-wave 1, i. e. the magnetic flux of the system does not change its direction. The armature of the electro-magnet is not likely to buzz.

If $R_1$=resistance of winding $W_I$
$R_2$=resistance of winding $W_{II}$
$R=R_1+R_2$
$n_1$=number of turns of winding $W_I$
$n_2$=number of turns of winding $W_{II}$
$U$=applied alternating voltage
$AW$=number of ampere-turns, then, we may write:

$$AW_1 = \frac{U \cdot n_1}{R_1} = \text{active number of ampere-turns during half-wave 1}$$

$$AW_2 = \frac{U}{R_1+R_2} \cdot (n_2-n_1) = \text{active number of ampere-turns during half wave 2 respectively}$$

It has been particularly advantageous to make $AW_1=AW_2$, when $R_1 \cdot n_2$ is equal $n_1 \cdot (R+R_1)$ and it follows that $$n_2 = n_1 \frac{R+R_1}{R}$$

If, for example, we make $R=2R_1$, then we obtain $$n_2 = \frac{3}{2} \cdot n_1$$

Figure 2:
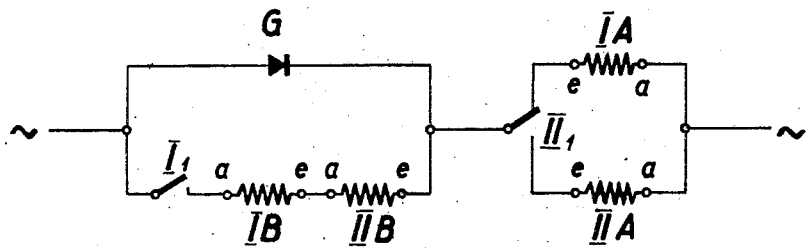
Fig. 2 shows a circuit with two relays and with a rectifier cell for producing impulsions.

In Fig. 2 is illustrated a further executional form.

The two relays I and II possess each two different windings A and B which are connected in series and opposing each other. The relay I is provided with the working contact $I_r$ and the relay II with the change-over contact $II_r$. The excitation of winding $I_A$ during working is sufficient to actuate contact $I_r$. Similarly the excitation of winding $II_B$ is sufficient to actuate contact $II_I$.

Figure 3:
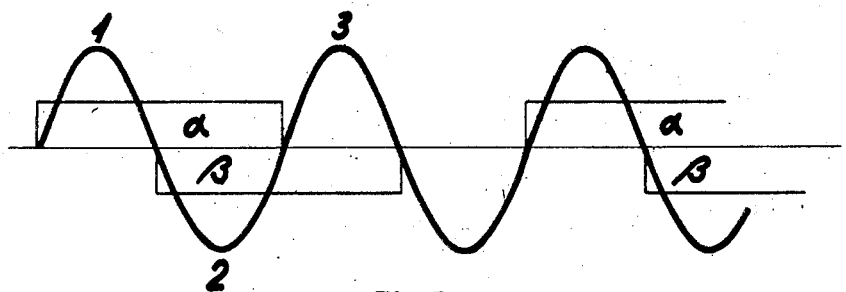
Fig. 3 shows in a diagram the impulsions of the executional form according to Fig. 2 in function of the alternating current waves.

The working is the following:

The rectifier G forms a short circuit for half-wave 1. Thus, during this half-wave current flows through the winding $I_A$. This actuates the contact $I_I$. The following half-wave 2 goes through the windings $I_B$, $II_B$ and $I_A$. The relay II is being excited and the change-over contact $II_I$ actuated. The relay I still retains its armature in attracted position because current still flows through the winding $I_B$. During the next change of direction, that is during the half-wave 3, no current flows through the windings $I_B$ and $II_B$ because the rectifier does not exert a cutting action. The relay I is not excited, whereas the relay II is excited through winding $II_A$. At the end of half-wave 3, the armature of relay II is also released due to the cutting action of the rectifier. The circuit enables to obtain, by means of special contacts of relays I and II, not shown in the drawing, two series of impulsions $\alpha$ and $\beta$ which in function of time, show for example the shape as represented in Fig. 3.

Figure 4:
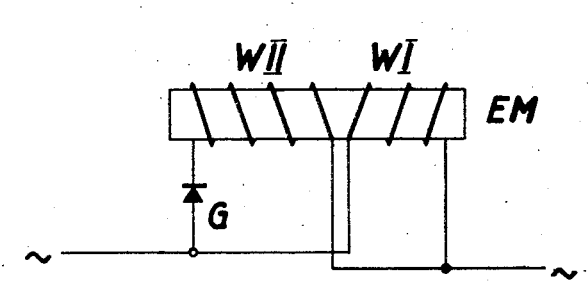
Fig. 4 shows a further electro-magnet with two windings in cooperation with a rectifier valve.

A further executional form of the arrangement according to the invention is shown in Fig. 4. $W_I$ and $W_{II}$ again represent two magnetically-opposed excitation windings of the electro-magnet EM, which are connected in parallel and so dimensioned that the number of ampere-turns of $W_{II}$ is higher than that of $W_I$. In series with the winding $W_{II}$ is arranged a half-wave rectifier G. The working of the arrangement is as follows:

The half-wave 1 passes through the rectifier; current flows through both windings. The magnetic flux in the iron circuit of electro-magnet EM is equal to the difference of the two field components. During half-wave 2 the rectifier G exerts a cutting action, thus current flows only through the winding I. The existing magnetic flux possesses the same direction as the field during half-wave I.

If we take again $AW_1 = AW_2$, then we may write $$2 \cdot \frac{n_1}{n_2} = \frac{R_1}{R_2}$$

and we have for $2R_1 = 2R_2$:

$$n_1 = \frac{n_2}{4}$$

What I claim is:

1. In an electromagnetic circuit the combination of an alternating current-excited electromagnet comprising two magnetically-opposed windings having different ampere turns, a half-wave rectifier connected in series with one of the said windings and connected in parallel with the other of the said windings.

2. In an installation according to claim 1, the said windings being connected in series, and said rectifier being connected in parallel with the winding possessing the higher number of ampere-turns.

3. In an installation according to claim 1, said windings being connected in parallel, and said rectifier being in series with the winding possessing the higher number of ampere-turns.

4. In an installation according to claim 1, the said windings being connected in series, and said rectifier being connected in parallel with the winding possessing the higher number of ampere-turns, the same resultant number of ampere-turns being effective during both half-waves.

5. In an installation according to claim 1, said windings being connected in parallel, and said rectifier being in series with the winding possessing the higher number of ampere-turns, the same resultant number of ampere-turns being effective during both half-waves.

OTTO TSCHUMI.

REFERENCES CITED

The following references are of record in the file of this patent:

UNITED STATES PATENTS

| Number | Name | Date |
|---|---|---|
| 1,779,724 | Beard | Oct. 28, 1930 |
| 1,790,691 | Zierdt | Feb. 3, 1931 |
| 2,151,678 | Blankenbuehler | Mar. 28, 1939 |
| 2,320,841 | Abell | June 1, 1943 |